United States Patent [19]

Lee et al.

[11] Patent Number: 4,761,756

[45] Date of Patent: Aug. 2, 1988

[54] SIGNED MULTIPLIER WITH THREE PORT ADDER AND AUTOMATIC ADJUSTMENT FOR SIGNED OPERANDS

[75] Inventors: Hsiao-Peng S. Lee, Sunnyvale; John C. Oneto, Campbell; Stephen J. Rawlinson, Sunnyvale, all of Calif.

[73] Assignee: Amdahl Corporation, Sunnyvale, Calif.

[21] Appl. No.: 883,468

[22] Filed: Jul. 11, 1986

Related U.S. Application Data

[63] Continuation of Ser. No. 526,106, Aug. 24, 1983, abandoned.

[51] Int. Cl.[4] .............................................. G06F 7/52
[52] U.S. Cl. .................................... 364/757; 364/760
[58] Field of Search ...................... 364/760, 757, 759

[56] References Cited

U.S. PATENT DOCUMENTS

| | | | |
|---|---|---|---|
| 3,627,999 | 12/1971 | Iverson | 364/759 |
| 3,761,699 | 9/1973 | Sather | 364/759 |
| 3,866,030 | 2/1975 | Baugh et al. | 364/757 |
| 4,086,474 | 4/1978 | Negi et al. | 364/757 |
| 4,467,444 | 8/1984 | Harmon, Jr. et al. | 364/736 |
| 4,507,749 | 3/1985 | Ohhashi | 364/757 |

OTHER PUBLICATIONS

Capps et al., "Two's Complement Multiplication", *IBM Tech. Disclosure Bulletin*, vol. 20, No. 12, May 1978, pp. 5292-5293.

Davby et al., "Two's Complement Multiplier", *IBM Tech. Disclosure Bulletin*, vol. 18, No. 5, Oct. 1975, pp. 1482-1483.

Robertson, "Two's Complement Multiplication in Binary Parallel Digital Computers", *IRE-Trans.-Electronic Computers*, Sep. 1955, pp. 118-119.

*Primary Examiner*—David H. Malzahn
*Attorney, Agent, or Firm*—Fliesler, Dubb, Meyer & Lovejoy

[57] ABSTRACT

Disclosed is a signed multiplier for use in a data processing system that handles 2's complement operands. The signed multiplier operates to form a preliminary product independently of the signs of the multiplier and multiplicand. While the multiplication is in progress, the signs of the multiplier and multiplicand are checked. For multiplications where either one of the operands (multiplier or multiplicand) is negative, the preliminary product is modified by one or two correction factors. The correction factors are multiplies of the 2's complements of the operands. The correction factor or factors are added to the preliminary product to form the final product.

3 Claims, 3 Drawing Sheets

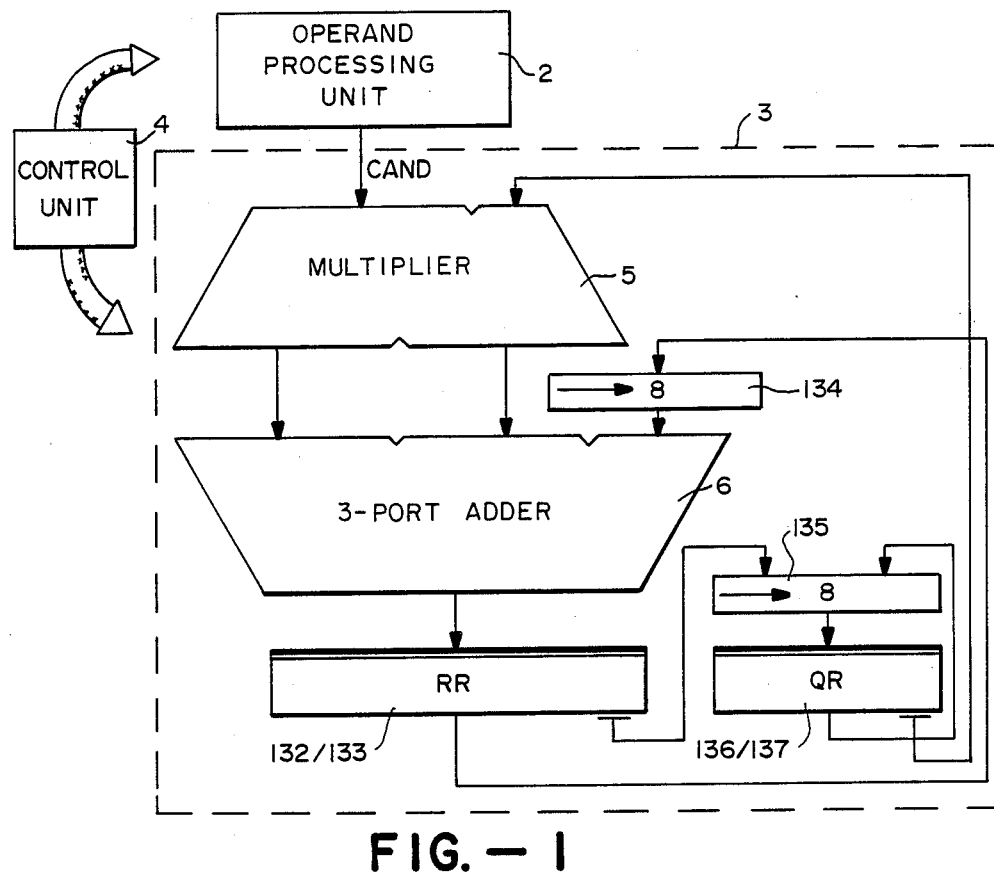
FIG.—1
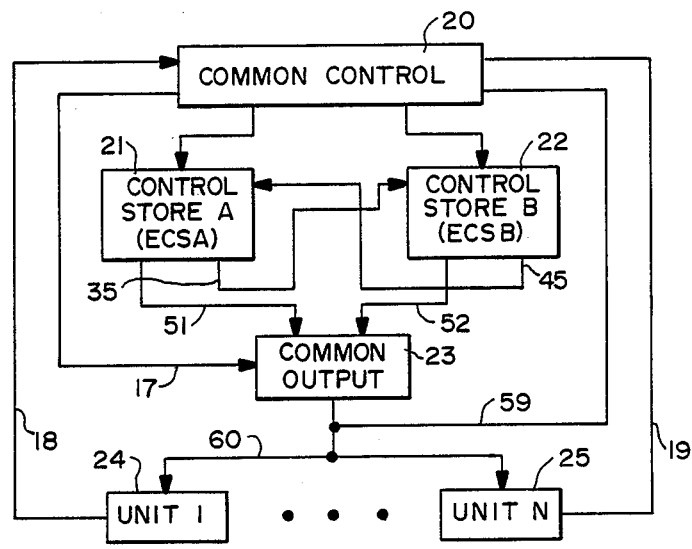
FIG.—2

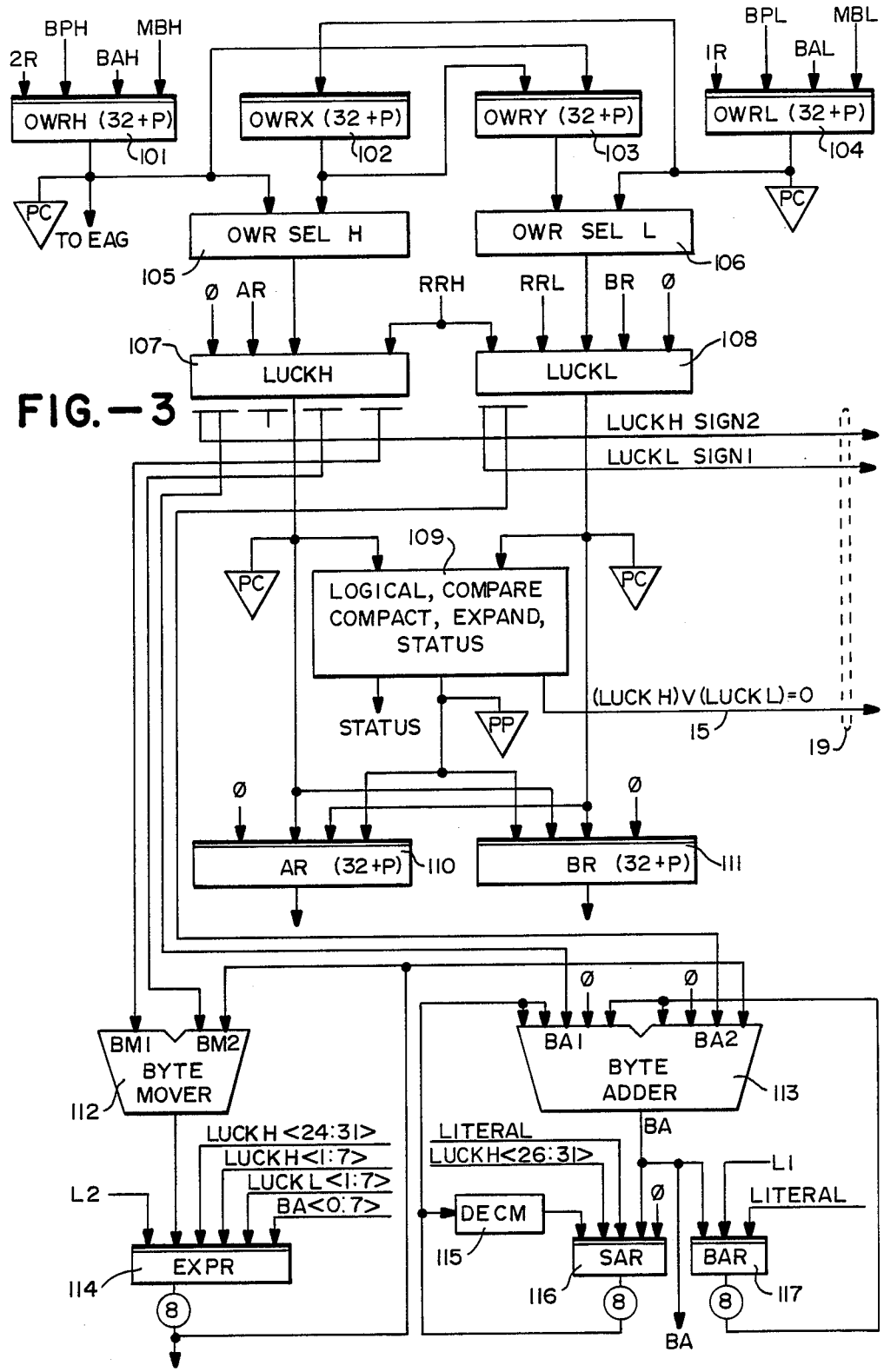
FIG.—3

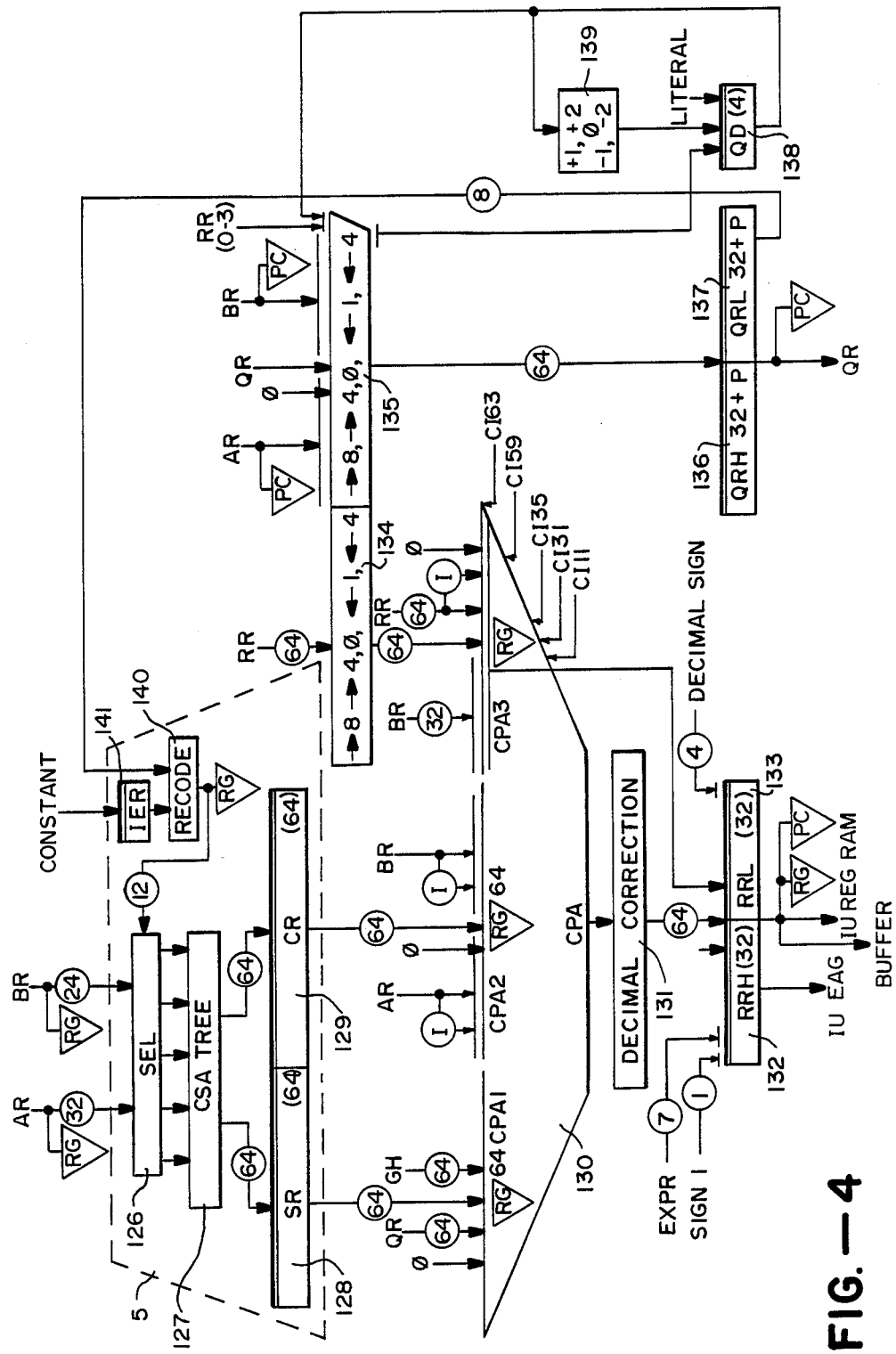
FIG.—4

SIGNED MULTIPLIER WITH THREE PORT ADDER AND AUTOMATIC ADJUSTMENT FOR SIGNED OPERANDS

CONTINUATION DATA

The present invention is a continuation of U.S. patent application entitled SIGNED MULTIPLIER, Ser. No. 06/526,106, filed Aug. 24, 1983, now abandoned.

BACKGROUND OF THE INVENTION

The present invention relates to multipliers for use in data processing systems.

Low performance computers frequently perform multiplication by a sequence of additions using an adder. Such approach takes many cycles of operation and thus is slow. High performance computers cannot tolerate long routines for multiplication. Therefore, high performance data processing systems generally include special functional units and/or special high speed routines to handle multiplication.

In multiplication, multipliers and multiplicands can both be positive and negative. Frequently, 2's complement form is employed to accommodate negative numbers. There are many ways to design multipliers to handle 2's complement multipliers and multiplicands. In one approach, the signs of both operands (multiplier and multiplicand) can be checked prior to commencing the multiplication. Depending upon the signs of the operands, the appropriate multiplication routine is executed to give the correct, final product. While such a method is satisfactory for many applications, it has the detriment that the multiplication routine cannot commence until after the signs have been checked. Such a procedure always requires a delay before the multiplication commences and such delay is wasteful of processing time. In another approach, sign extension hardware is used which operates in parallel with other multiplication hardware thereby avoiding extra processing time. The sign extension hardware, however, has the detriment of adding extra cost and complexity to the computer.

In accordance with the above background, there is a need for an improved multiplier and method of multiplication in a data processing system which avoids the extra cost required with sign extension hardware and which avoids the delays required for sign checking prior to the time that multiplication begins.

In general, multipliers for high-performance systems must be able to multiply relatively large operands. For example, a typical multiplier should be large enough to multiply 32-bit signed operands to form a 64-bit signed product, and to multiply 56-bit unsigned operands to form 112-bit unsigned products. However, the physical size of the multiplier must be minimized, by taking advantage, for example, of hardware provided for other purposes.

SUMMARY OF THE INVENTION

The present invention is a signed multiplier for use in a data processing system that handles 2's complement operands. The signed multiplier operates to form a preliminary product independently of the signs of the multiplier and multiplicand. While the multiplication is in progress, the signs of the multiplier and multiplicand are checked. For multiplications where either one of the operands (multiplier or multiplicand) is negative, the preliminary product is modified by one or two correction factors. The correction factors are multiples of the 2's complement of the operands. The correction factor or factors are added to the preliminary product to form the final product.

In one particular embodiment of the present invention a three-port adder is employed to add simultaneously three terms as part of the multiplication. When both operands are negative, the three-port adder simultaneously adds two correction factors to the preliminary product in order to form the final product.

The present invention achieves the objective of providing an improved multiplier and method for multiplying which has improved speed of multiplication and which does not require sign extension hardware.

The foregoing and other objects, features and advantages of the invention will be apparent from the following detailed description set forth in conjunction with the accompanying drawings.

BRIEF DESCRIPTION OF THE DRAWINGS

FIG. 1 depicts a block diagram of the signed multiplier of the present invention.

FIG. 2 depicts a dual microprogram control store which forms part of the FIG. 1 apparatus.

FIG. 3 depicts a block diagram of the operand processing unit of FIG. 1.

FIG. 4 depicts a detailed block diagram of the signed multiplier unit of FIG. 1.

DETAILED DESCRIPTION

Signed Multiplier—FIG. 1

In FIG. 1, a signed multiplier for use in a data processing system is shown. The signed multiplier includes the operand processing unit 2, the multiplier unit 3 and a control unit 4. The control unit 4 can be any conventional control unit for controlling operations of hardware in a data processing system. Typically, control unit 4 is a microprogram unit which operates to control multiplication by microprogram routines. In FIG. 1, the operands to be multiplied are supplied by the operand processing unit 2 to the multiplier unit 3. In one embodiment described, the multiplier unit 3 includes a high-speed multiplier 5 and a three-port adder 6.

Control Unit—FIG. 2

In FIG. 2, the control unit 4 of FIG. 1 is shown. Typically unit 4 has two or more control stores including the E CONTROL STORE A (ECSA) 21 and the E CONTROL STORE B (ECSB) 22. The control stores 21 and 22 each store microinstructions and are initiated and controlled by a common control 20. Microinstructions are selected by a common output 23 for controlling units in a data processing system. The units 24 and 25 in FIG. 2 are typical units and, for example, can be the processing unit 2 and the multiplying unit 3 of FIG. 1. The control unit of FIG. 2, in one typical embodiment, is like that described in the application entitled, MULTIPLE MODULE CONTROL STORE FOR USE IN A DATA PROCESSING SYSTEM, Ser. No. 184,126, filed on Sept. 4, 1980, now abandoned in favor of continuation application Ser. No. 06/655,949, filed on Sept. 28, 1984, now U.S. Pat. No. 4,587,611 and assigned to the assignee of the present invention.

In FIG. 2, the A control store 21 provides microinstruction control words on bus 51 to the common output 23. Similarly, the B control store 22 provides microinstruction control words on bus 52 to the common output 23. The common output 23 selects a control word from either bus 51 or from bus 52 for controlling the units 24 and 25. The A control store 21 and the B control store 22 each provide control words on buses 51 and 52 for each machine cycle.

Each cycle, the A control store 21 also provides a branch address on bus 35 to the B control store 22. Similarly, each cycle, the B control store 22 provides a branch address on bus 45 to the A control store 21. Each cycle, the common control 20 determines for both the A and B control stores 21 and 22 whether the branch address from the other control store or the sequential address is to be selected. The sequential address is the address of the next instruction in sequence. The common control 20 receives on lines 59 an indication from the common output 23 whether or not a branch is specified by the current control word. Common control 20 senses via lines 18 and 19 the state of branch conditions within the controlled units 24 and 25 and decides whether or not any branch is to be taken. The common control 20, via lines 17, controls the common output 23 to select the microinstruction control word from the A or B control stores 21 or 22. This selected control word controls the state of the units 24 and 25.

In one embodiment, the common control contains latches which control the signed multiplier (not shown) and these latches include SIGN1-TRIGGER, SIGN2-TRIGGER, and ZERO-TRIGGER. The outputs of these latches assist in the determination of whether or not a branch should be taken. Common output 23 sends signals along lines 59 to common control 20 to determine which, if any, of these latches should be tested.

Operand Processing Unit—FIG. 3

In FIG. 3, apparatus useful in carrying out a fixed-point multiply operation within a data processing system is shown.

In FIG. 3, four 32-bit operand word registers 101, 102, 103 and 104 are provided for storing operands which are to be processed in accordance with instructions from microprogram control stores. Registers 101 and 102 provide input to the operand word register selector 105 and registers 103 and 104 provide inputs to the operand word register selector 106. Selector 105 selects an input for the LUCKH selector 107 and selector 106 provides an input to the LUCKL selector 108. The LUCKH SIGN2 line from selector 107 indicates the sign of the operand 2 selected by the selector 107. The LUCKL SIGN1 line from selector 108 indicates the sign of the operand 1 selected by the selector 108. Selectors 107 and 108 select the operands to provide inputs to the LUCK unit 109, to the A register (AR) 110 and to the B register (BR) 111. Both the AR and BR are 32 bits wide.

In FIG. 3, operands 1 and 2 from the selectors 108 and 107 are operated upon by unit 109 which performs logical, compare, compact, expand, and status operations. While such operations are conventional, they are not all required for the particular example being described. For the purpose of the present invention, unit 109 detects whether or not either the operand 1 from the LUCKL selector 108 or the operand 2 from the LUCKH selector 107 is equal to ZERO to provide a branch condition indication on the (LUCKH) v (LUCKL)=0 line 15.

In FIG. 3, a byte mover 112 selects one byte (8 bits) from the selectors 107 or 108 and moves it to appropriate locations in the data processing system. To perform additions, the byte adder 113 receives inputs from the selectors 107 and 108, shift amount register (SAR) 116, or the byte adder register (BAR) 117. The decrementor 115 is provided to decrement the contents of SAR register 116. None of the units of this paragraph except SAR are necessary for a signed multiply operation and hence can be ignored. The SAR register 116 is loaded with a shift amount to control shifter 134 and 135 of FIG. 4.

Multiply Unit—FIG. 4

In FIG. 4, selector 126 is provided for selecting the recoded copies of the operand from the AR register 110 and the BR register 111 from FIG. 3 under the control of the recode unit 140. The recoded copies of the operands are input to a carry-save adder tree 127. Outputs from the carry-save adder tree 127 are stored in a 64-bit SR register 128 and a 64-bit CR register 129. The output of the SR register 128 forms one input to a carry propagate adder (CPA) 130. The output from the CR register 129 provides a second input to the carry propagate adder 130. A shifter 134 shifts the contents of the result register 132/133 to form a third input to the carry propagate adder 130. In FIG. 4, the registers 128, 129, and 141, the recoder 140, the selector 126 and the CSA tree 127 constitute the multiplier 5 of FIG. 1. The multiplier works together with the 3-port adder and the other hardware shown in FIG. 4 to perform multiplications. The quotient register 136/137 is loaded by a quotient shifter 135.

The quotient shifter shifts inputs from the AR register 110 and the BR register 111 of FIG. 3, or from the quotient register 136/137. Hardware also exists in FIG. 4 to perform functions not related to multiplication. Various other control and data are indicated in connection with the FIG. 3 and FIG. 4 apparatus. Registers are represented by boxes with heavy bars at the top and such registers are clocked at the end of each machine cycle by a clock signal.

Description of the Multiplication Process

The basic hardware in FIGS. 3 and 4 includes a 56×8 bit multiplier 5, a 64-bit 3-port adder 130, a pair of registers (AR 110 and BR 111) to hold the multiplicand, a pair of registers (SR 128 and CR 129) to hold the output of the multiplier, a RR register (RRH 132 and RRL 133) to hold the partial product and the final result, and a QR register (QRH 136 and QRL 137) to hold the multiplier operand and the low-order part of a product that is longer than 64 bits. RR and QR also hold the adjustment terms if the operands are negative numbers.

The multiplier hardware uses the entire multiplicand (56 bits) along with the low-order 8 bits of the multiplier operand to form a 64-bit partial sum and a 64-bit partial carry which when added together form a partial product. While this operation is going on, QR is shifted 8 bits to the right so that the next 8 bits of the multiplier operand will be available for the next multiplication.

While the second multiplication is taking place, the partial sum and partial carry from the first multiplication are added together to form the first partial product. While the third multiplication is taking place, the partial product of the first multiplication is shifted to the right by 8 bits with the least significant 8 bits being shifted into QR and the remaining 56 bits being added together with the partial sum and partial carry of the second multiplication. This process continues until the partial sum and partial carry of the final multiplication are added together with the partial product of the previous multiplications.

In TABLE 1, a 56×56 unsigned multiplication is described. In TABLE 1 and TABLE 2, the symbol "-:" has the same meaning as the symbol "->" in TABLE 3 and they mean that the operand location on the right receives the data from the operand location on the left.

TABLE 1

Steps to Perform Unsigned 56 × 56 Multiplication

1. Multiplier —: AR(8:31) BR(0:31)
   0 —: AR(0:7)
2. AR, BR —: QRSH —: QR
   No shift
   Multiplicand —: AR(0:31), BR(0:23)
   0 —: RR
3. QR(56:63) —: IER
   AR(0:31), BR(0:23) —: CAND    Form first SUM, CARRY
   Multiply Results —: SR, CR
   QR —: QRSH —: QR
   Shift right 8
4. SR —: CPA1
   CR —: CPA2    Form first partial product
   RR —: RRSH —: CPA3
   CPA —: RR
   QR (56:63) —: IER
   AR(0:31), BR(0:23) —: CAND    Form second SUM, CARRY
   Multiply Result —: SR, CR
   QR —: QRSH —: QR
   Shift right 8
5,6,7,8,9    Repeat (4) to form third to seventh SUM, CARRY and second to sixth partial products.
10. SR —: CPA1
    CR —: CPA2    Final 112-bit product is
    RR —: RRSH —: CPA3    in RR (0:63), QR (0:47)
    CPA —: RR
    Shift right 8
    EXIT

Mathematics of Signed 32×32 Multiplication

Multiplication of signed numbers with negative numbers in 2's complement form consists of unsigned multiplication to form a preliminary product followed by an adjustment to form the final product. There are four cases C1, C2, C3 and C4 in which C2, C3 and C4 require adjustment.

C1. Multiplicand positive, multiplier positive (No adjustment)
C2. Multiplicand positive, multiplier negative
C3. Multiplicand negative, multiplier positive
C4. Multiplicand negative, multiplier negative In 2's complement notation, the highest-order bit for negative numbers is "1" and that for positive numbers is "0". For a 32-bit number, the positive numbers range from 0 to $(2^{31}-1)$. For a 32-bit number, the absolute value of the negative numbers range from 1 to $(2^{31})$. For 32-bit operands, a negative number $(-Q)$, where Q is positive between 1 and $2^{31}$, is represented by the 2's complement notation $[2^{32}-Q]$. If a negative number in 2's complement form, $[2^{32}-Q]$, is again 2's complemented, the positive value $Q=2^{32}-[2^{32}-Q]$ is obtained.

C2. Adjustment for Multiplicand (OP1) Positive And Multiplier (OP2) Negative Let the positive multiplicand equal [A]. Let the negative multiplier equal $[2^{32}-Q]$ where A and Q are greater than 0. The desired 64-bit final product is $-(A)(Q)$ which in 2's complement notation is $[2^{64}-AQ]$.

The preliminary product obtained from unsigned multiplication of the negative multiplier $[2^{32}-Q]$ and the positive multiplicand, A, is $(2^{32})(A)-(A)(Q)$.

The adjustment which must be added to the preliminary product to form the final product is the quantity $[2^{64}-(2^{32})(A)]$ or $(2^{32})[2^{32}-A]$.

This adjustment is achieved by adding the 2's complement, $[2^{32}-A]$, of the 32-bit operand A, in register AR, to the high-order bits 0:31 of the preliminary product in RR.

Since $[2^{32}-A]$ is added to the high-order bits, it is effectively multiplied by $2^{32}$ so that the added value is the desired adjustment, $(2^{32})[2^{32}-A]$.

C3. Adjustment for Multiplicand Negative, Multiplier Positive

Let the negative multiplicand equal $[2^{32}-A]$.
Let the positive multiplier equal Q where A and Q are greater than 0. The desired product is $[2^{64}-(A)(Q)]$.

The preliminary product obtained from unsigned multiplication is $(2^{32})(Q)-(A)(Q)$.

The adjustment which must be added to the preliminary product to form the final product is the quantity $[2^{64}-(2^{32})(Q)]$ or $(2^{32})[2^{32}-Q]$.

This adjustment is achieved by loading the 2's complement, $[2^{32}-Q]$, of Q into the low-order bits of register RR (32:63) at the start of the multiplication. At the same time, zero is loaded into the high-order bits of QR (0:31). As the multiplication proceeds, the 2's complement of Q, $[2^{32}-Q]$, shifts right until it ends up in the high-order bits of QR (0:31) thereby multiplying $[2^{32}-Q]$ by $2^{32}$ and forming the adjustment $[2^{64}-(2^{32})Q]$ in register QR. At this time, zero is in the low-order bits QR (32:63). The adjustment is completed by adding the adjustment in QR to the preliminary product in RR.

C4. Adjustment for Multiplicand Negative, Multiplier Negative

Let the negative multiplicand equal $[2^{32}-A]$.
Let the negative multiplier equal $[2^{32}-Q]$ where A and Q are greater than 0. The desired product is $(A)(Q)$.

The product obtained from unsigned multiplication is $[2^{32}-A][2^{32}-Q]$ or $[2^{64}-(2^{32})(A)]-(2^{32})(Q)+(AQ)$ The adjustment which must be added to the preliminary product to form the final product is the quantity $(2^{32})(A)+(2^{32})(Q)$.

This adjustment is achieved by loading the 2's complement of $[(2^{32}-Q)]$, the multiplier, into RR (32:63) at the start of the multiplication. At the same time, zero is loaded into QR (0:31), and multiplicand $[2^{32}-A]$ is loaded into AR. As the multiplication proceeds, Q shifts right until it ends up in QR (0:31) thereby forming $(2^{32})(Q)$. At this time, zero is in QR (32:63) and $[2^{32}-A]$ is still in Ar. The adjustment is completed by adding QR to RR and by subtracting $[2^{32}-A]$ in AR from RR (0:31). The subtraction is implemented by gating the 1's complement of $[2^{32}-A]$ in AR into the adder and adding +1 to form the 2's complement, +A. The 2's complement, +A, is added to the high-order bits RR (0:31) and hence is effectively $(2^{32})(A)$. This adjustment is done in one step with the three-port adder.

The apparatus of FIGS. 3 and 4 is typically used to perform a high-speed multiply. In a fixed-point multiplication, the product of the multiplier (the second operand) and the multiplicand (the first operand) is found and replaces the original multiplicand. The multiplicand and the multiplier typically are x-bit operands and the product is a 2x-bit operand. The final product is formed in each case by adding one or two adjustment factors to an unsigned preliminary product. The adjustment for each negative operand is equal to $2^x$ times the other operand.

A 32×32 fixed-point multiply operation is carried out in accordance with the microprogram summarized in the following TABLE 2.

TABLE 2

Fixed Point Steps to Perform Signed 32 × 32 Multiply

S1. Multiplicand —: AR
    Multiplier —: BR
    Test for either operand to be zero
    (This test allows for quick completion if the product is zero.)

S2. 0, BR —: QRSH —: QR
    No shift
    0 —: CPA1
    0 —: CPA2H
    BR_INV —: CPA2L
    0 —: CPA3
    1 —: Adder_Carry In (Bit 63)
    CPA —: RR (Zero is in RR (0:31) if multiplier nonzero)
    0 —: BR
    Branch to (8) if either operand is zero S3. QR (56:63) —: IER
    AR (0:31), BR (0:23) —: CAND   Form first SUM, CARRY
    Multiply result —: SR, CR
    QR —: QRSH —: QR
    Shift right 8

S4. SR —: CPA1
    CR —: CPA2             Form first partial product
    RR —: RRSH —: CPA3
    CPA —: RR
    QR (56:63) —: IER
    AR (0:31), BR (0:23) —: CAND   Form second SUM, CARRY
    Multiply result —: SR, CR
    QR —: QRSH —: QR
    Shift right 8

S5. SR —: CPA1
    CR —: CPA2             Form second partial product
    RR —: RRSH —: CPA3
    CPA —: RR
    QR (56:63) —: IER
    AR (0:31), BR (0:23) —: CAND   Form third SUM, CARRY
    Multiply results —: SR, CR
    QR —: QRSH —: QR
    Shift right 8
    Branch to (10) if either operand negative S6. SR —: CPA1
    CR —: CPA2             Form third partial product
    RR —: RRSH —: CPA3
    CPA —: RR
    QR (56:63) —: IER
    AR (0:31), BR (0:23) —: CAND   Form fourth SUM, CARRY
    Multiply result —: SR, CR
    QR —: QRSH —: QR
    Shift right 8

S7. SR —: CPA1
    CR —: CPA2             Form the final product
    RR —: RRSH —: CPA3
    CPA —: RR
    Shift right 8
    EXIT

S8. 0 —: CPA1
    0 —: CPA2
    0 —: CPA3
    CPA —: RR
    EXIT

S10. SR —: CPA1
    CR —: CPA2             Form third partial product
    RR —: RRSH —: CPA3
    CPA —: RR
    QR (56:63) —: IER
    AR (0:31), BR (0:23) —: CAND   Form fourth SUM, CARRY
    Multiply result —: SR, CR
    QR —: QRSH —: QR
    Shift right 8
    Branch to (15) if multiplier operand negative S11. SR —: CPA1
    CR —: CPA2             Form fourth partial product
    RR —: RRSH —: CPA3
    CPA —: RR
    Shift right 8
    Hold QR S12. QR —: CPA1
    0 —: CPA2              Adjust
    RR —: CPA3
    CPA —: RR
    EXIT S15. SR —: CPA1
    CR —: CPA2             Form fourth partial product
    RR —: RRSH —: CPA3
    CPA —: RR
    Shift right 8
    Hold QR
    Branch to (18) if multiplicand negative S16. 0 —: CPA1
    AR_INV —: CPA2H
    All Ones —: CPA2L      Adjust
    RR —: CPA3
    1 —: Adder Carry In (Bit 63)
    CPA —: RR
    EXIT S18. QR —: CPA1
    AR_INV —: CPA2H
    All Ones —: CPA2L      Adjust
    RR —: CPA3
    1 —: Adder Carry In (Bit 63)
    CPA —: RR
    EXIT A detailed microprogram for implementing the TABLE 2 summary is set forth in the following TABLE 3.

TABLE 3

```
                    /* MR, M -- 5C */
/* MULTIPLY (FIXED-POINT)                                    */    2
/*                                                           */    3
/*                                                           */    4
/* MNEMONICS:  MR, M                                         */    5
/* OP CODES:   1C, 5C                                        */    6
/* FORMAT:     RR, RX                                        */    7
/* OPERATION:  THE PRODUCT OF THE MULTIPLIER (THE SECOND OPERAND)  */  8
/*     AND THE MULTIPLICAND (THE FIRST OPERAND) REPLACES THE       */  9
```

```
/*      MULTIPLICAND.  THE MULTIPLICAND AND MULTIPLIER ARE 32-BIT       */    10
/*      OPERANDS; THE PRODUCT IS A 64-BIT OPERAND.                      */    11
/* CONDITION CODE:  UNCHANGED                                           */    12
/*                                                                      */    13
/* FLOW:                                                                */    14
/*                          (EITHER FACTOR ZERO)                        */    15
/*      START --> $1 --> $2A ------------------------> $8B ---> NULL    */    16
/*                         |                                    |       */    17
/*             (BOTH FACTORS)                                   |       */    18
/*             ( NONZERO  )                                     V       */    19
/*                         |                                   EXIT     */    20
/*                         V                                            */    21
/*             $4A <-- $3A                                              */    22
/*              |                                                       */    23
/*              |                                                       */    24
/*              |   ( EITHER )                              ( BOTH  )   */    25
/*              |   ( FACTOR )     ( OP2  )               ( FACTORS)    */    26
/*              V   (NEGATIVE)     (NEGATIVE)             (NEGATIVE)    */    27
/*             $5A ----------> $10B ----------> $15A ----------> $18B   */    28
/*              |                                                |      */    29
/*     ( BOTH  )|    (OP2)|           (OP1)|                     |      */    30
/*     (FACTORS)|    ( + )|           ( + )|                     |      */    31
/*     (POSITIVE)|                                               |      */    32
/*              V          V                V                    V      */    33
/*             $6A        $11B             $16A                 EXIT    */    34
/*              |          |                                            */    35
/*              |          |                                            */    36
/*              V          V                                            */    37
/*             $7A        $12B             EXIT                         */    38
/*              |          |                                            */    39
/*              |          |                                            */    40
/*              V          V                                            */    41
/*             EXIT       EXIT                                          */    42
/*                                                                      */    43

/* MR, M -- 5C */
/* PIPELINE SEQUENCE:                                                          45
/*                                                                     */     46
/*         G B L E E - - - - E E E W WD                                */     47
/*            |------EUBI-----|                                        */     48
/*                                                                     */     49
/* CONTROL-STORE REQUIREMENT:      ECSA =  8                           */     50
/*                                 ECSB =  5                           */     51
/*                                 ---------                           */     52
/*                                 TOTAL ECS = 13                      */     53
/*                                                                     */     54
/* TIMING:    CYCLE-TIME = 3 + NZ*(3 + NEG)                            */     55
/*                                                                     */     56
/*            WHERE NEG = 1 IF EITHER FACTOR IS NEGATIVE               */     57
/*                  NZ  = 1 IF BOTH FACTORS ARE NONZERO                */     58
/*                                                                     */     59
/*            FACTOR      FACTOR      NUMBER OF CYCLES                 */     60
/*            --------    --------    ----------------                 */     61
/*            POSITIVE    POSITIVE           6                         */     62
/*            POSITIVE    NEGATIVE           7                         */     63
/*            NEGATIVE    POSITIVE           7                         */     64
/*            NEGATIVE    NEGATIVE           7                         */     65
/*               0        (ANYTHING)         3                         */     66
/*                                                                     */     67
/*                                                                     */     68
```

```
                    /* MR, M -- 5C */                                          70
BEGIN MR;                                                                      71
                                                                               72
CSECT LCS;                                                                     73
                                                                               74
ORIGIN '5C'X;                                                                  75
                                                                               76
EUMR: EUM:   $1:                                                               77
       OWRH  -> OWRSELH,                                                       78
       OWRL  -> OWRSELL,                                                       79
       OWRSELH -> LUCKH,        /* OP2 */                                      80
       OWRSELL -> LUCKL,        /* OP1 */                                      81
       LUCKH_SIGN -> SIGN2_TRIGGER,                                            82
       LUCKL_SIGN -> SIGN1_TRIGGER,                                            83
       0 -> SAR,                                                               84
       LUCKH -> BR,             /* OP2 */                                      85
       LUCKL -> AR,             /* OP1 */                                      86
       IF LUCKH=0 OR LUCKL=0 THEN 1 ELSE 0 ENDF -> ZERO_TRIGGER,               87
       1 -> TEST_DATA_VALID,                                                   88
       ECSA -> CONTROL_STORE,                                                  89
       $2A -> ECS_ADDR;                                                        90
                                                                               91
CSECT ECSA;                                                                    92
                                                                               93
$2A:   0 -> BR,                 /* OP1 IN AR, 0 IN BR */                       94
       (0/(0..31),BR/(32..63)) -> QRSH,                                        95
       QRSH -> QR,              /* 0 -> QRH, OP2 -> QRL */                     96
       0 -> CPA1,                                                              97
       (0/(0..31),BR_INV/(32..63)) -> CPA2,                                    98
       0 -> CPA3,                                                              99
       HOT_CARRY_63 -> ADDER_CARRY_IN,                                        100
       CPA -> RR,               /* 0 -> RRH, OP2 INVERTED -> RRL */           101
         /* NOTE:  IF OP2 NOT ZERO, THEN THERE IS NO CARRY INTO RRH */        102
         /*        IF OP2 IS ZERO, WE DON'T CARE WHAT GOES INTO RR  */        103
       8 -> SAR,                                                              104
       ZERO_TRIGGER -> BRANCH,                                                105
       $8B -> BRANCH_ADDRESS;                                                 106
                                                                              108
                    /* MR, M -- 5C */                                         109
$3A:   0 -> CPA1,                /* 1ST MULTIPLY */                           110
       0 -> CPA2,                                                             111
       RRSH -> CPA3,             /* OP1 IN AR, 0 IN BR */                     112
       CPA -> RR,                /* 0 -> RR(0..39) */                         113
       QR(56..63) -> IER_RECODE, /* OP2 COMPLEMENTED ->      */               114
       QR -> QRSH,               /*    RR(40..63), QR(0..7) */                115
       QRSH -> QR,               /* 0 -> QR(8..39) */                         116
       RRSH -> QR_SHIFT_IN,      /* OP2(0..23) -> QR(40..63) */               117
       RIGHT -> SHIFT_DIRECTION,                                              118
       LOGICAL -> SHIFT_TYPE;                                                 119
                                                                              120
$4A:   SR -> CPA1,               /* 2ND MULTIPLY, 1ST ADD */                  121
       CR -> CPA2,               /* OP1 IN AR, 0 IN BR */                     122
       RRSH -> CPA3,             /* PARTIAL PRODUCT -> RR(0..39) */           123
       CPA -> RR,                /* 0 -> RR(40..47) */                        124
       QR(56..63) -> IER_RECODE, /* OP2 COMPLEMENTED ->      */               125
       QR -> QRSH,               /*    RR(48..63), QR(0..15) */               126
       QRSH -> QR,               /* 0 -> QR(16..47) */                        127
       RRSH -> QR_SHIFT_IN,      /* OP2(0..15) -> QR(48..63) */               128
       RIGHT -> SHIFT_DIRECTION,                                              129
       LOGICAL -> SHIFT_TYPE;                                                 130
                                                                              131
$5A:   SR -> CPA1,               /* 3RD MULTIPLY, 2ND ADD */                  132
       CR -> CPA2,               /* OP1 IN AR, 0 IN BR    */                  133
       RRSH -> CPA3,             /* PARTIAL PRODUCT -> RR(0..47) */           134
       CPA -> RR,                /* 0 -> RR(48..55) */                        135
       QR(56..63) -> IER_RECODE, /* OP2 COMPLEMENTED ->      */
```

```
            QR -> QRSH,                    /*    RR(56..63), QR(0..23) */
            QRSH -> QR,                    /* 0 -> QR(24..55) */
            RRSH -> QR_SHIFT_IN,           /* OP2(0..7) -> QR(56..63) */
            RIGHT -> SHIFT_DIRECTION,
            LOGICAL -> SHIFT_TYPE,
            SIGN1_TRIGGER | SIGN2_TRIGGER -> BRANCH,
            $10B -> BRANCH_ADDRESS;

/* BOTH OPERANDS ARE POSITIVE */
$6A:        SR -> CPA1,                    /* 4TH MULTIPLY, 3RD ADD */
            CR -> CPA2,
            RRSH -> CPA3,                  /* OP1 IN AR, O IN BR */
            CPA -> RR,                     /* PARTIAL PRODUCT -> RR(0..55) */
            QR(56..63) -> IER_RECODE,      /* 0 -> RR(56..63) */
            QR -> QRSH,                    /* OP2 COMPLEMENTED -> QR(0..31) */
            QRSH -> QR,                    /* 0 -> QR(32..63) */
            RRSH -> QR_SHIFT_IN,
            RIGHT -> SHIFT_DIRECTION,
            LOGICAL -> SHIFT_TYPE,
            LLFC -> LFCL,
            EARLY_NOTICE -> I_UNIT;

/* MR, M -- 5C */
$7A:        SR -> CPA1,
            CR -> CPA2,                    /* 4TH ADD */
            RRSH -> CPA3,
            CPA -> RR,                     /* FINAL PRODUCT -> RR */
            RIGHT -> SHIFT_DIRECTION,
            LOGICAL -> SHIFT_TYPE,
            LLFC -> LFCL,
            1 -> BRANCH,
            EXIT_LOOP_1B -> BRANCH_ADDRESS;

CSECT ECSB;

$8B:        0 -> RR,                       /* PRODUCT IS ZERO */
            LLFC -> LFCL,
            EARLY_NOTICE -> I_UNIT,
            1 -> BRANCH,
            EXIT_LOOP_1A -> BRANCH_ADDRESS;

/* MR, M -- 5C */

CSECT ECSB;

/* AT LEAST ONE OPERAND IS NEGATIVE */
$10B:       SR -> CPA1,                    /* 4TH MULTIPLY, 3RD ADD */
            CR -> CPA2,
            RRSH -> CPA3,                  /* OP1 IN AR, O IN BR */
            CPA -> RR,                     /* PARTIAL PRODUCT -> RR(0..55) */
            QR(56..63) -> IER_RECODE,      /* 0 -> RR(56..63) */
            QR -> QRSH,                    /* OP2 COMPLEMENTED -> QR(0..31) */
            QRSH -> QR,                    /* 0 -> QR(32..63) */
            RRSH -> QR_SHIFT_IN,
            RIGHT -> SHIFT_DIRECTION,
            LOGICAL -> SHIFT_TYPE,
            SIGN2_TRIGGER -> BRANCH,
            $15A -> BRANCH_ADDRESS;
```

```
            /* OP1 IS NEGATIVE, OP2 IS POSITIVE */
$11B: SR -> CPA1,                    /* 4TH ADD */
      CR -> CPA2,
      RRSH -> CPA3,                  /* OP1 IN AR, 0 IN BR */
      CPA -> RR,                     /* PRELIMINARY PRODUCT -> RR */
      QR(56..63) -> IER_RECODE,
      RIGHT -> SHIFT_DIRECTION,      /* OP2 COMPLEMENTED IN QR(0..31) */
      LOGICAL -> SHIFT_TYPE,         /* 0 IN QR(32..63) */
      LLFC -> LFCL,
      EARLY_NOTICE -> I_UNIT;

$12B: QR -> CPA1,
      0 -> CPA2,
      RR -> CPA3,
      CPA -> RR,
        /* THIS CYCLE MAKES AN ADJUSTMENT TO THE RESULT     */
        /* BECAUSE OP1 WAS IN 2'S COMPLEMENT FORM.          */
        /*                                                  */
        /* LET X = ABSOLUTE VALUE OF OP1                    */
        /*     Y = ABSOLUTE VALUE OF OP2                    */
        /*                                                  */
        /*     THE PRODUCT DESIRED IS -X*Y                  */
        /*     (IN 2'S COMPLEMENT FORM, THIS IS REPRESENTED */
        /*            BY 2**64 - X*Y, BUT THIS IS THE SAME  */
        /*            AS -X*Y BECAUSE THE RESULT REGISTER   */
        /*            HAS ONLY 64 BITS)                     */
        /*                                                  */
        /*     BECAUSE OP1 IS REPRESENTED AS 2**32 - X,     */
        /*            THE RESULT PRODUCED AT THE END OF     */
        /*            THE PREVIOUS CYCLE IS                 */
        /*            (2**32)*Y - X*Y                       */
        /*            THEREFORE, THIS CYCLE ADJUSTS THE     */
        /*            PRODUCT BY SUBTRACTING (2**32)*Y      */
        /*            (ACTUALLY, BY ADDING 2**64 - (2**32)*Y) */
        /*                                                  */
      LLFC -> LFCL,
      1 -> BRANCH,
      EXIT_LOOP_1A -> BRANCH_ADDRESS;

/* MR, M -- 5C */

CSECT ECSA;

/* OP2 IS NEGATIVE */
$15A: SR -> CPA1,                    /* 4TH ADD */
      CR -> CPA2,
      RRSH -> CPA3,                  /* OP1 IN AR, 0 IN BR */
      CPA -> RR,                     /* PRELIMINARY PRODUCT -> RR */
      QR(56..63) -> IER_RECODE,
      RIGHT -> SHIFT_DIRECTION,      /* OP2 COMPLEMENTED IN QR(0..31) */
      LOGICAL -> SHIFT_TYPE,         /* 0 IN QR(32..63) */
      LLFC -> LFCL,
      EARLY_NOTICE -> I_UNIT,
      SIGN1_TRIGGER -> BRANCH,
      $18B -> BRANCH_ADDRESS;

/* OP1 IS POSITIVE, OP2 IS NEGATIVE */
$16A: 0 -> CPA1,
      (AR_INV/(0..31),BR_INV/(32..63)) -> CPA2,
      RR -> CPA3,
      HOT_CARRY_63 -> ADDER_CARRY_IN,
      CPA -> RR,
        /* THIS CYCLE MAKES AN ADJUSTMENT TO THE RESULT     */
        /* BECAUSE OP2 WAS IN 2'S COMPLEMENT FORM.          */
        /*                                                  */
        /* LET X = ABSOLUTE VALUE OF OP1                    */
        /*     Y = ABSOLUTE VALUE OF OP2                    */
```

```
/*          THE PRODUCT DESIRED IS -X*Y                      */
/*          (IN 2'S COMPLEMENT FORM, THIS IS REPRESENTED     */
/*                  BY 2**64 - X*Y, BUT THIS IS THE SAME     */
/*                  AS -X*Y BECAUSE THE RESULT REGISTER      */
/*                  HAS ONLY 64 BITS)                        */
/*                                                           */
/*          BECAUSE OP2 IS REPRESENTED AS 2**32 - Y,         */
/*                  THE RESULT PRODUCED AT THE END OF        */
/*                  THE PREVIOUS CYCLE IS                    */
/*                  (2**32)*X - X*Y                          */
/*                  THEREFORE, THIS CYCLE ADJUSTS THE        */
/*                  PRODUCT BY SUBTRACTING (2**32)*X         */
/*                                                           */
     LLFC -> LFCL,
     1 -> BRANCH,
     EXIT_LOOP_1B -> BRANCH_ADDRESS;

/* MR, M -- 5C */

CSECT ECSB;

/* OP1 IS NEGATIVE, OP2 IS NEGATIVE */
$18B: QR -> CPA1,
      (AR_INV/(0..31),BR_INV/(32..63)) -> CPA2,
      RR -> CPA3,
      HOT_CARRY_63 -> ADDER_CARRY_IN,
      CPA -> RR,
/*          THIS CYCLE MAKES AN ADJUSTMENT TO THE RESULT     */
/*          BECAUSE OP1 AND OP2 WERE IN 2'S COMPLEMENT FORM. */
/*                                                           */
/*          LET X = ABSOLUTE VALUE OF OP1                    */
/*              Y = ABSOLUTE VALUE OF OP2                    */
/*                                                           */
/*          THE PRODUCT DESIRED IS X*Y                       */
/*                                                           */
/*          BECAUSE OP1 IS REPRESENTED AS 2**32 - X,         */
/*              AND OP2 IS REPRESENTED AS 2**32 - Y,         */
/*                  THE RESULT PRODUCED AT THE END OF        */
/*                  THE PREVIOUS CYCLE IS                    */
/*                  2**64 - (2**32)*X - (2**32)*Y + X*Y      */
/*                  THEREFORE, THIS CYCLE ADJUSTS THE        */
/*                  PRODUCT BY ADDING (2**32)*X (ACTUALLY,   */
/*                  BY SUBTRACTING (2**32)*(-X)) AND ALSO    */
/*                  ADDING (2**32)*Y                         */
/*                                                           */
     LLFC -> LFCL,
     1 -> BRANCH,
     EXIT_LOOP_1A -> BRANCH_ADDRESS;

ENDB MR;
```

What is claimed is:

1. An apparatus for multiplying a first operand having a sign by a second operand having a sign in 2's complement form to provide a final product, comprising:

a first register for storing the first operand;

means, coupled to the first register, for generating a complement of the first operand;

a second register for storing the second operand;

means, coupled to the second register, for generating a complement of the second operand;

means, coupled to the first register and the second register to receive the first operand and an increment of the second operand, for multiplying the first operand by the increment of the second operand and to generate a partial sum output and a partial carry output;

third register means, coupled to the means for multiplying, for storing the partial sum output and the partial carry output;

a result register;

three port adder means, having a first port, a second port and a third port, for adding data received at the first, second and third ports to generate a resulting sum and supplying the resulting sum to the result register, the first port, second port and third port connected to receive in any given machine cycle up to three of the following data, the partial sum output from the third register, the partial carry output of the third register, the first operand, the complement of the first operand, the second operand, the complement of the second operand, the contents of the result register or zero;

control means, coupled to the means for multiplying and the three port adder means, for controlling the means for multiplying and the three port adder means to successively generate partial sum and carry outputs and to add the partial sum and carry outputs to the contents of the result register to generate a partial product until a final partial product is generated; and adjustment means, responsive to the sign of the first operand and of the second operand for generating an adjustment, the adjustment being determined by a first condition in which the first operand is negative and the second operand is positive, a second condition in which the first operand is positive and the second operand is negative, and a third condition in which both the first and second operands are negative, including means, responsive to the first condition, for controlling the adder means to add the complement of the second operand to contents of high order bits of a final partial product in the result register, means, responsive to the second condition, for controlling the adder means to add the complement of the first operand to the contents of the result register before generation of a partial product, and means, responsive to the third condition, for controlling the adder means to add a multiple of the complement of the first operand to the contents of the result register before generation of a partial product and to add a multiple of the complement of the second operand to high order bits of the final partial product in the result register.

2. The apparatus of claim 1, wherein the adjustment means generates the adjustment in a single cycle.

3. The apparatus of claim 1, wherein the adjustment means generates the adjustment in a single cycle after generation of the final partial product.

* * * * *